United States Patent [19]

Markbreiter et al.

[11] Patent Number: 4,822,393
[45] Date of Patent: Apr. 18, 1989

[54] NATURAL GAS PRETREATMENT PRIOR TO LIQUEFACTION

[75] Inventors: Stephen J. Markbreiter, Edison, N.J.; Irving Weiss, Merrick, N.Y.

[73] Assignee: Kryos Energy Inc., New York, N.Y.

[21] Appl. No.: 212,870

[22] Filed: Jun. 30, 1988

[51] Int. Cl.[4] .............................................. F25J 3/00
[52] U.S. Cl. ........................................... 62/17; 62/20; 62/23; 62/40
[58] Field of Search .................. 62/9, 11, 17, 20, 23, 62/36, 40–42; 55/68, 74, 75

[56] References Cited

U.S. PATENT DOCUMENTS

| | | | |
|---|---|---|---|
| 3,130,026 | 4/1964 | Becker | 62/17 |
| 3,312,073 | 4/1967 | Jackson et al. | 62/9 |
| 3,498,067 | 3/1970 | Ranke | 62/17 |
| 4,252,548 | 2/1981 | Markbreiter et al. | 62/41 X |

Primary Examiner—Steven E. Warner
Attorney, Agent, or Firm—Paul W. Garbo

[57] ABSTRACT

Conventional liquified natural gas (LNG) plants are designed to eliminate moisture and up to 1.0% by volume of carbon dioxide ($CO_2$) present in gas delivered by pipelines. Pipelines can no longer be expected to supply gas with such a low $CO_2$ content. The invention pretreates gas with as much as 1.5% to 3.5% by volume of $CO_2$ so that it becomes acceptable to LNG plants. The pretreatment involves scrubbing natural gas with cold methanol at a temperature below −30° F. and flashing absorbed $CO_2$ from methanol withdrawn from the scrubber by passing it through a pressure-reducing valve, followed by two successive warming flashings of $CO_2$. Then, the methanol can be recycled to the scrubber. Required refrigeration is supplied to the methanol entering or leaving the scrubber.

11 Claims, 1 Drawing Sheet

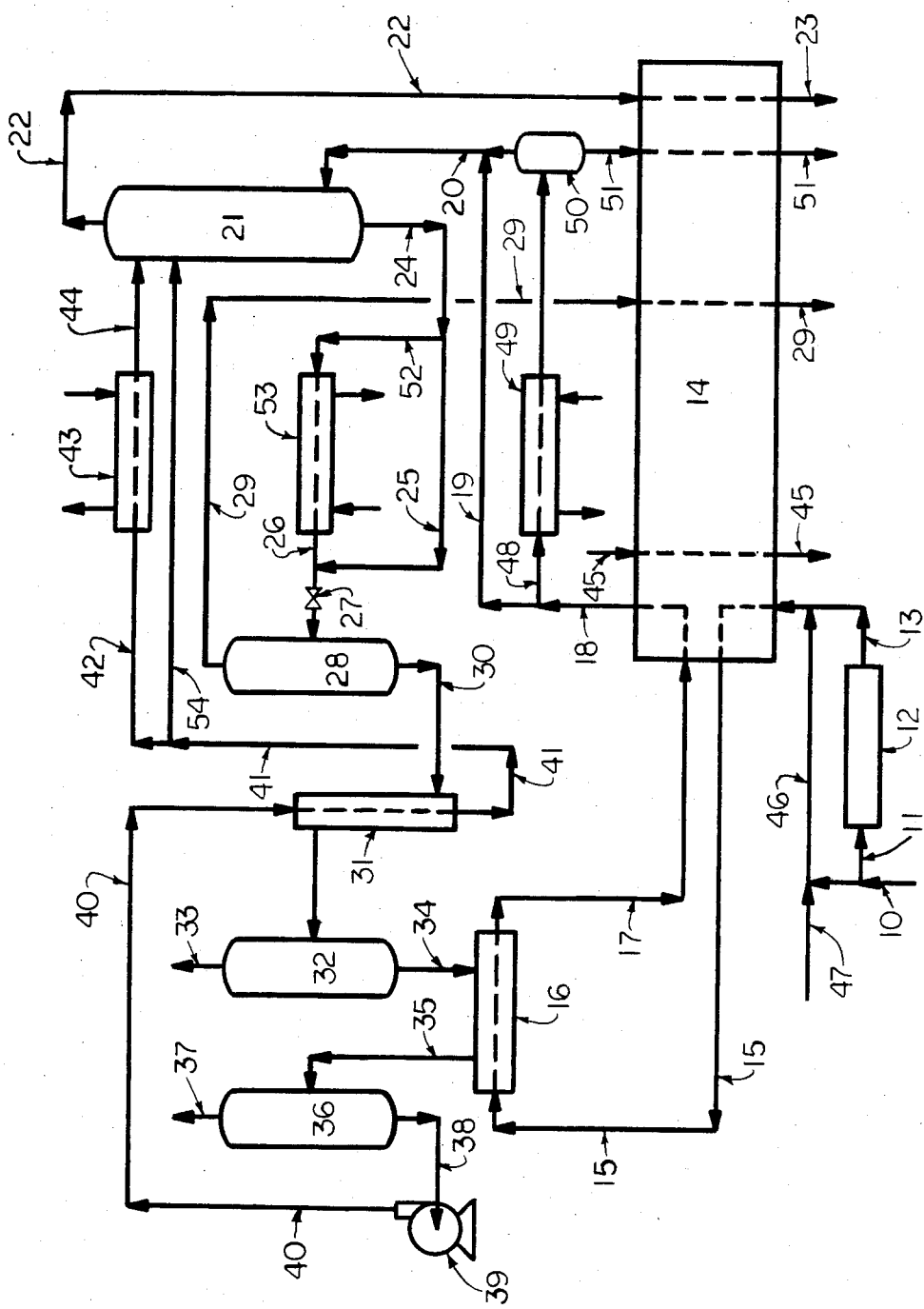

NATURAL GAS PRETREATMENT PRIOR TO LIQUEFACTION

BACKGROUND OF THE INVENTION

This invention relates to the pretreatment of natural gas prior to liquefaction and, more particularly, to the reduction of the carbon dioxide ($CO_2$) content of natural gas.

There are probably over 60 LNG (liquified natural gas) plants in operation in the United States which receive natural gas at elevated pressure from transmission pipelines and liquefy it for storage. The stored LNG is used in periods of peak demand in a gas distribution system when the transmission pipeline alone cannot satisfy the peak demand.

The natural gas delivered to LNG plants contains moisture and $CO_2$. To date, pipeline operators have been able to deliver natural gas containing not more than about 1.0% by volume of $CO_2$. However, in recent years, the wells have been producing natural gas with a slowly increasing content of $CO_2$. To liquefy natural gas, it is necessary to first eliminate moisture and $CO_2$ because both of these impurities would solidify at the temperatures required to liquefy natural gas and the solids thus formed would plug the equipment and render the LNG plant inoperative.

All LNG plants in this country use one of two basic systems for eliminating moisture and not more than about 1.0% by volume of $CO_2$. The system of the great majority of LNG plants is hereinafter referred to as system A while system B will refer to that of the other LNG plants.

System A comprises a group of vessels filled with molecular sieves adapted to adsorb the moisture of natural gas passed therethrough, and a second group of vessels filled with molecular sieves adapted to adsorb the $CO_2$ of natural gas passed therethrough.

System B comprises means for injecting methanol into the natural gas, for chilling the gas to condense all of the moisture and methanol, and for removing the condensed moisture and methanol from the dry natural gas which is then passed through a $CO_2$ absorption unit involving the use of methanol to remove $CO_2$ from the dry natural gas and the use of a stripping gas to eliminate absorbed $CO_2$ from the methanol so that it can be recycled for the absorption and removal of $CO_2$ from the dry natural gas.

Existing systems A and B have been designed and built to dry natural gas and to eliminate as much as about 1.0% by volume of $CO_2$. The dual facts that systems A and B are inadequate for natural gas containing about 1.5% by volume of $CO_2$ or more and that natural gas from pipelines can no longer be expected to have a maximum $CO_2$ content of 1.0% by volume have created an urgent search by LNG plant operators for an economically feasible plan for averting the prospective disastrous shut-down of their LNG plants because of increased $CO_2$ content of natural gas available from transmission pipelines.

A principal object of this invention is to provide an economically feasible pretreatment of natural gas containing in excess of 1.0% by volume of $CO_2$ prior to liquefaction.

Another important object is to integrate equipment of existing LNG plants with additional equipment required by the new pretreatment of natural gas and thus minimize the purchase of additional equipment.

A further object is to provide a flexible pretreatment that is capable of giving adequate removal of $CO_2$ from natural gas in spite of foreseeable variations in the $CO_2$ content of natural gas delivered to LNG plants.

These and other objects and advantages of the invention will be evident from the description which follows.

SUMMARY OF THE INVENTION

In accordance with this invention, natural gas containing moisture and $CO_2$ in excess of 1.0% by volume and supplied at elevated pressure, generally in the range of about 150 to 600 pounds per square inch absolute (psia), is first dehydrated and then scrubbed with cold methanol to decrease its $CO_2$ content to not more than about 1.0% by volume. The methanol scrubbing or absorption method of the invention has sufficient flexibility that it can treat natural gas with a $CO_2$ content in the range of about 1.5% to 3.5% by volume and decrease that content to not more than about 1.0% by volume.

The first step of dehydration is carried out with equipment currently used in LNG plants. Plants that have the previously described system A will continue to dehydrate the natural gas by contact with molecular sieves. Other plants with system B will continue to dehydrate the gas by the injection of methanol, chilling the mixture to condense the moisture and methanol and removal of the condensate. System B is integrated with the equipment required for the pretreatment of this invention as will be fully explained hereinafter.

The dry natural gas is then processed according to this invention by scrubbing at a pressure of at least about 150 psia with cold methanol supplied at a temperature in the range of about $-30°$ F. to $-80°$ F. so that the $CO_2$ content of the gas initially in the range of about 1.5% to 3.5% by volume is decreased to not more than about 1.0% by volume in the scrubbed gas. The methanol withdrawn from the scrubbing or absorption column has, of course, been enriched in absorbed $CO_2$. The quantity of $CO_2$ picked up by the cold methanol during its passage through the absorption column must be removed before the methanol can be returned to the top of the column.

A noteworthy feature of the invention is that the stripping of absorbed $CO_2$ from methanol is accomplished without the application of external heat and without the use of a stripping gas. The stripping of $CO_2$ from methanol to the extent desired to permit the recycling of methanol to the absorption column is carried out by a pressure-reduction flashing separation of $CO_2$ vapor from the liquid methanol, followed by two successive warming flashing separations of $CO_2$ vapor from the liquid methanol which then has a residual content of absorbed $CO_2$ of not more than about 0.7% on a molar basis. Preferably, the residual $CO_2$ content is decreased to the range of about 0.5% to 0.6% on a molar basis. All of the heat required in the two warming flashing separations is derived solely from the heat normally present in the natural gas that is being pretreated.

Inasmuch as the scrubbing operation is conducted at low temperatures below $-30°$ F., external refrigeration must be supplied to the process. Another remarkable feature of the invention is that all of the refrigeration required for the scrubbing operation can be applied at a single point, specifically, to the methanol supplied to, or withdrawn from, the scrubbing column. The quantity of external refrigeration will vary with the pressure of the gas undergoing scrubbing as well as with the initial $CO_2$ content of the natural gas. Thus, natural gas containing 2.0% by volume of $CO_2$ can be pretreated by this invention to bring the $CO_2$ content down to 1.0% by volume with the expenditure of about 50 tons of refrigeration per million standard cubic feet per hour (MMSCFH) of natural gas if scrubbing is conducted at a pressure of 425 psia but scrubbing the same gas at a pressure of 150 psia will require about 65 tons of refrigeration per MMSCFH. Processing a natural gas containing 3.0% by volume of $CO_2$ will use more refrigeration than one with a lower $CO_2$ content when both are scrubbed at the same pressure. For example, natural gas containing 3.0% by volume of $CO_2$ scrubbed at a pressure of 425 psia will require about 62 tons of refrigeration per MMSCFH. For the variation of 1.5% to 3.5% by volume of $CO_2$ in the natural gas to be pretreated as well as for the variation of pressure from 150 to 600 psia, the refrigeration requirement of this invention will generally be in the range of 45 to 70 tons of refrigeration per MMSCFH.

As already mentioned, the methanol with absorbed $CO_2$ withdrawn from the scrubber undergoes a pressure-reduction flashing separation of $CO_2$ vapor from the liquid methanol. The greater the pressure reduction or drop the greater is the chilling produced and to that extent the use of external refrigeration is lessened. Referring back to the natural gas with a $CO_2$ content of 2.0% by volume, 50 tons of refrigeration per MMSCFH are sufficient because approximately 15% more refrigeration is generated when the $CO_2$-laden methanol from the scrubber at a pressure of about 415 psia is passed through a pressure-reducing valve and discharged at a pressure of about 20 psia. By contrast, the natural gas also containing 2.0% by volume of $CO_2$ and scrubbed at a pressure of 150 psia requires about 65 tons of refrigeration per MMSCFH because the chilling effect produced by the relatively small pressure reduction is equivalent to less than 2% of the external refrigeration applied to the methanol.

When the refrigeration generated by passing the $CO_2$-laden methanol through a pressure-reduction valve is low, the external refrigeration is applied directly to the recycled methanol supplied to the absorption column. But as the pressure drop through the valve increases and as the $CO_2$ content of the natural gas increases, the quantity of refrigeration generated also increases so that external refrigeration can be more judiciously applied to methanol withdrawn from the scrubber prior to its passage through the pressure-reducing valve. While external refrigeration could be applied to the methanol entering the absorption column in all cases, it would be wasteful in cases where a significant quantity of refrigeration is generated by the passage of the $CO_2$-laden methanol through the pressure-reducing valve. As an approximate guide, the application of external refrigeration directly to the methanol withdrawn from the scrubber is beneficial when the natural gas being scrubbed has a $CO_2$ content of about 3.0% by volume and a pressure of about at least 200 psia. If the $CO_2$ content of the natural gas is only about 2.0% by volume, the pressure in the scrubber would have to be higher, say about at least 250 psia, to make it advantageous to apply the external refrigeration to the methanol leaving the scrubber.

Another interesting feature of the invention is the rate at which recycled methanol passes through the absorption column. In general, the methanol circulation rate falls in the range of about 200 to 450 gallons per minute per MMSCFH of scrubbed gas.

BRIEF DESCRIPTION OF THE DRAWING

The further description of the invention will refer to the accompanying drawing which is a diagram of the equipment used to carry out the novel pretreatment of natural gas.

DESCRIPTION OF PREFERRED EMBODIMENTS

The description of preferred embodiments of the invention will include data of specific examples.

Natural gas containing 95.3% methane, 2.7% ethane and 2.0% $CO_2$ by volume as well as moisture is drawn from pipeline 10 through line 11 and molecular sieves 12 adapted to dehydrate the gas and thence discharges at a pressure of 158 psia and temperature of 100° F. into line 13 which enters heat exchanger 14. Molecular sieves 12 are merely part of system A frequently associated with an LNG plant. The dry gas is cooled in exchanger 14 by countercurrent streams of pretreated gas and separated $CO_2$, both of which countercurrent streams will be identified hereinafter. After the dry gas has been partially cooled to a temperature of 60° F., it is withdrawn through line 15 and passed through heat exchanger 16 wherein the gas is further cooled to a temperature of 30° F. The cold gas then flows through line 17 back to an intermediate point in exchanger 14 for still further cooling. The fully cooled gas leaves exchanger 14 through line 18 at a temperature of −60° F. and flows via lines 19,20 into the bottom of absorption column or scrubber 21 at a pressure of 155 psia. Therein the gas is contacted with cold methanol supplied to the top of scrubber 21 at a temperature of −70° F. The scrubbed gas containing only about 1.0% by volume of $CO_2$ exits column 21 at a temperature of about −65° F. and flows via line 22 through exchanger 14 as the aforesaid countercurrent stream of pretreated gas. The pretreated gas issuing from exchanger 14 through line 23 at a temperature of 60° F. and pressure of about 153 psia is ready for passage through the other part of system A of an LNG plant, namely, the molecular sieve beds adapted to eliminate about 1.0% by volume of $CO_2$ remaining in the pretreated natural gas. This example illustrates how the molecular seives 12 for dehydration and the molecular sieves for $CO_2$ adsorption of an existing system A of an LNG plant are fully utilized by integration with the pretreatment equipment of this invention.

Methanol with absorbed $CO_2$ is withdrawn from column 21 by line 24 and at a pressure of 154 psia and temperature of −62° F. flows via lines 25,26 to pressure-reducing valve 27, discharging therefrom into flashing separator 28 at a pressure of about 19 psia and temperature of −67° F. The released $CO_2$ vapor flows from separator 28 through line 29 directly to and through exchanger 14 as the aforesaid countercurrent stream of separated $CO_2$, exiting at a temperature of 60° F.

Methanol drained from separator 28 passes via line 30 through heat exchanger 31 wherein it is warmed to a temperature of 15° F. by a countercurrent stream of methanol from a third flashing separation soon to be identified. The warmed methanol undergoes a second flashing separation in separator 32. Released $CO_2$ vapor exits through line 33 while liquid methanol flows through line 34 and heat exchanger 16 countercurrent to the aforesaid passage of dry natural gas to help lower the temperature of the gas. Of course, the methanol is warmed in exchanger 16 so that the methanol leaving through line 35 at a temperature of 22° F. undergoes the aforesaid third flashing separation in separator 36. Released $CO_2$ vapor exits separator 36 via line 37 while methanol draining through line 38 into pump 39 is raised to a pressure of 170 psia for recycling to scrubber 21.

From pump 39, the methanol flows through line 40 and heat exchanger 31 as the countercurrent stream that warms methanol from first separator 28. Of course, the methanol from third separator 36 is cooled in exchanger 31 and at a temperature of −63° F. flows via lines 41,42 to external refrigeration exchanger 43. The temperature of the methanol is dropped to −70° F. by supplying to exchanger 43 65 tons of refrigeration per MMSCFH of gas passing through scrubber 21. The chilled methanol is discharged from exchanger 43 via line 44 into scrubber 21.

With the methanol recirculated from column 21 through the three flashing separations of separators 28,32,36 by pump 39 back to column 21 at the rate of 402 gallons per minute per MMSCFH of gas scrubbed, the $CO_2$ content of the methanol withdrawn from column 21 is about 1.0% on a molar basis while the recycled methanol supplied to column 21 has a $CO_2$ content of 0.5% on a molar basis. A small quantity of refrigeration is utilized by passing cold boil-off vapor from the LNG plant through line 45 and exchanger 14.

As another embodiment of the invention, natural gas containing 95% methane, 3% ethane and 2% $CO_2$ on a volume basis as well as moisture is delivered by pipeline 10 at a pressure of 415 psia and temperature of 100° F. to an LNG plant having system B for drying the gas and removing about 1.0% by volume of $CO_2$. In accordance with system B, the gas from pipeline 10 flows through lines 46,13, partially through exchanger 14, through line 15, exchanger 16, and line 17 and through the colder part of exchanger 14 into line 18 at a pressure of 408 psia and temperature of about −33° F. In accordance with system B of an LNG plant, methanol is injected by line 47 to saturate the natural gas flowing through line 46. Also, pursuant to system B, auxiliary refrigeration is applied to the gas-methanol mixture flowing from line 18 through line 48 and heat exchanger 49 to drop the temperature to −45° F. so that all of the moisture and methanol is condensed and separated from the natural gas in knock-out drum 50. The dry gas with only traces of residual methanol vapor passes from drum 50 via line 20 into scrubber 21, at a pressure of 405 psia.

The condensate of water and methanol at a temperature of −45° F. drains from drum 50 through line 51 and in passing through exchanger 14 helps to cool the natural gas entering exchanger 14 via line 13. Again, it is evident that elements 47,48,49,50,51 are parts of the gas dehydration portion of system B of an LNG plant which have been integrated with the adjacent required for the pretreatment of this invention. Thus, the invention makes good use of the dehydration portion of system B and the auxiliary refrigeration associated therewith.

The gas is contacted with cold methanol supplied to the top of scrubber 21 at a temperature of −55° F. The scrubbed gas containing only about 1.0% by volume of $CO_2$ leaves column 21 at a temperature of about −45° F. and flows via line 22 through exchanger 14 to cool the incoming natural gas. The pretreated gas exiting exchanger 14 through line 23 at a pressure of 400 psia and temperature of 73° F. is ready for passage through the other part of system B of an LNG plant wherein the gas is further scrubbed with methanol to eliminate about 1.0% by volume of $CO_2$ remaining in the pretreated gas. Unlike the scrubbing operation of this invention, the conventional methanol scrubbing of system B involves stripping absorbed $CO_2$ from methanol with a stripping gas. As in the previous example, this invention takes full advantage of both the dehydration and $CO_2$ removal portions of system B in preparing natural gas for liquefaction.

Methanol enriched with absorbed $CO_2$ is withdrawn from column 21 by line 24 and is passed by line 52 through refrigeration heat exchanger 53 wherein the temperature of the methanol is dropped from −41° F. to −47° F. The thus chilled methanol at a pressure of 402 psia flows through line 26 and pressure-reducing valve 27 to discharge into flashing separator 28 at a pressure of 20 psia and temperature of −59° F. The flashed $CO_2$ vapor passes from separator 28 via line 29 directly to and through exchanger 14 to cool the incoming natural gas, exiting at a temperature of 80° F.

Methanol from separator 28 flows through line 30 and heat exchanger 31 to discharge at an increased temperature of about −2° F. into flashing separator 32. Released $CO_2$ vapor leaves separator 32 through line 33 while methanol flows via line 34 through exchanger 16 wherein it is further warmed to a temperature of 5° F. and thence passed by line 35 to flashing separator 36. Flashed $CO_2$ vapor leaves separator 36 via line 37 and methanol flows through line 38 into pump 39 which raises the pressure from about 16 psia to 450 psia so that the methanol can be returned to scrubber 21.

The methanol flows from pump 39 through line 40 and exchanger 31 wherein it is cooled and at a temperature of −55° F. and pressure of 435 psia is conveyed by lines 41,54 to the top of column 21.

Recirculating the methanol from column 21 and the three successive flashing separators 28,32,36 by pump 39 back to column 21 at the rate of 230 gallons per minute per MMSCFH of scrubbed gas, the $CO_2$ content of the methanol drawn from column 21 is about 1.5% on a molar basis but is down to 0.6% on a molar basis when the methanol reenters via line 54. It is advisable to pass cold boil-off vapor at a temperature of about −150° F. from the LNG plant through line 45 and exchanger 14 to utilize the small quantity of refrigeration in that vapor.

Modifying this last example only by an increase in the $CO_2$ content of the natural gas to be pretreated pursuant to this invention from 2.0% to 3.0% by volume, the flow of the gas starting at a pressure of 415 psia and temperature of 100° F. from pipeline 10 remains the same through all the units used by this invention. The temperatures and pressures of the gas are substantially unchanged from the conditions recited in the last example until the gas enters column 21 through line 20. Because of the higher $CO_2$ content of the gas, the temperature of the $C_2$-laden methanol drained through line 24 is −39° F. and that of the methanol recycled to the top of column 21 is −53° F., both temperatures being slightly warmer than those in the previous example. The refrigeration supplied to the methanol passing through exchanger 53 is 63 tons per MMSCFH of gas flowing through scrubber 21 which is appreciably more than the 51 tons of refrigeration required in the previous example. The rate of recycling methanol by pump 39 is also increased from the previous 230 to about 260 gallons per minute per MMSCFH of scrubbed gas. Under these conditions of external refrigeration and rate of methanol recirculation, the $CO_2$ content of the methanol flowing out of scrubber 21 is 2.1% on a molar basis but is decreased to 0.6% on a molar basis after passing through flashing separators 28,32,36 for return to column 21.

In this example, the temperatures are higher downstream of first flashing separator 28; specifically, the temperatures are 28° F. in separator 32 and 37° F. in separator 36. The $CO_2$ vapor released in separators 28,32,36 is accompanied with an appreciable quantity of methane, substantially all the higher hydrocarbons originally present in the natural gas, and a very small quantity of methanol. For example, the approximate composition of the vapor leaving separator 28 is in the first example: 81.8% methane, 9.8% higher hydrocarbons, 8.4% $CO_2$ by volume and only traces of methanol; in the second example: 76.4% methane, 11.9% higher hydrocarbons, 11.7% $CO_2$ by volume and traces of methanol; and in the third example: 72.6% methane, 11.3% higher hydrocarbons, 16.0% $CO_2$ and traces of methanol. In successive separators 32,36 the flashed vapor diminishes in methane content and increases in content of higher hydrocarbons, $CO_2$ and methanol. In the vapor from last separator 36, the $CO_2$ content will at least equal the methane content as in the second example and can be more than three times the methane content as in the third example.

In practice, the three vapor streams 29,33,37 are combined and used as fuel to generate power. The methane content of combined streams 29,33,37 is 5.7% of the methane in the natural gas pretreated by this invention in the first example, is 7.2% in the second example, and is 8.0% in the third example. Hence, more than 90% of the methane passing through scrubber 21 is delivered to the LNG plant for liquefaction. Higher hydrocarbons, predominantly ethane, present in the natural gas processed by this invention are substantially completely removed from the methane sent to the LNG plant and this is a distinct advantage of the invention because higher hydrocarbons are troublesome to the molecular sieves of system A adapted to adsorb $CO_2$ or to the absorption column of system B used to eliminate $CO_2$ before methane is liquefied.

With the benefit of the foregoing detailed discussion of the invention, many variations and modifications of the invention will be apparent to those skilled in the art without departing from the spirit or scope of the invention. For example, while it has been shown that all of the external refrigeration can be best applied to the methanol either entering or leaving scrubber 21, part of the required refrigeration can be supplied to the methanol entering scrubber 21 and the other part to the methanol drawn from scrubber 21. When methanol is used to dehydrate the natural gas, the injection of methanol by line 47 can be moved from line 46 to line 15 or 17. Although advisable, it is not essential for the methanol-water condensate in line 51 to pass through exchanger 14; the external refrigeration would be somewhat increased if stream 51 were omitted from exchanger 14. While exchanger 14 is shown as one unit, it can be two units connected in series, line 15 being connected to the coler end of the first unit and line 17 being connected to the warmer end of the second unit. Accordingly, only such limitations should be imposed on the invention as are set forth in the appended claims.

What is claimed is:

1. The pretreatment of natural gas having an elevated pressure and containing moisture and about 1.5% to 3.5% by volume of $CO_2$ prior to liquefaction of said natural gas which comprises the steps of:
   (a) dehydrating said natural gas;
   (b) partially cooling said natural gas by heat exchange with countercurrent streams of pretreated natural gas and separated $CO_2$, both said streams being hereinafter identified;
   (c) further cooling said partially cooled natural gas from step (b) by heat exchange with a countercurrent stream of methanol withdrawn from a second flashing separation, hereinafter identified;
   (d) still further cooling said further cooled natural gas from step (c) by heat exchange with said countercurrent streams of pretreated natural gas and separated $CO_2$;
   (e) scrubbing said still further cooled natural gas from step (d) at a pressure of at least 150 psia with cold recycled methanol supplied at a temperature in the range of about $-30°$ F. to $-80°$ F. and containing not more than about 0.7% on a molar basis of absorbed $CO_2$ at the start of said scrubbing;
   (f) passing the scrubbed gas containing not more than about 1.0% by volume of $CO_2$ as the aforesaid countercurrent stream of pretreated natural gas in steps (b) and (d);
   (g) passing methanol withdrawn from said scrubbing of step (e) through a pressure-reducing valve to effect a substantial pressure drop and a first flashing separation of absorbed $CO_2$ from said methanol;
   (h) passing said first flash-separated $CO_2$ as the aforesaid countercurrent stream of separated $CO_2$ in steps (b) and (d);
   (i) heating methanol withdrawn from said first flashing separation of step (g) by heat exchange with a countercurrent stream of methanol withdrawn from a third flashing separation, hereinafter identified;
   (j) effecting a second flashing separation of absorbed $CO_2$ from said heated methanol from said first flashing separation of step (g);
   (k) warming methanol withdrawn from said second flashing separation of step (j) by passage as the aforesaid countercurrent stream in step (c) to effect said third flashing separation of absorbed $CO_2$ to yield the aforesaid countercurrent stream of methanol from said third flashing separation with a residual $CO_2$ content of not more than about 0.7% on a molar basis;
   (l) recycling to said scrubbing of step (e) the aforesaid countercurrent stream of methanol from said third flashing separation of step (k) after being chilled by said heat exchange of step (i) with methanol from said first flashing separation of step (g); and
   (m) applying external refrigeration to methanol withdrawn from or supplied to said scrubbing of step (e) to maintain the temperature of said recycled methanol supplied to said scrubbing in said range of about $-30°$ F. to $-80°$ F.

2. The pretreatment of claim 1 wherein boil-off vapor from liquefied natural gas is passed as a countercurrent stream in heat exchange with the natural gas undergoing cooling in steps (b) and (d).

3. The pretreatment of claim 1 wherein the recycled methanol supplied to the scrubbing of step (e) is at a temperature in the range of about $-50°$ F. to $-70°$ F.

and contains from about 0.5% to about 0.6% on a molar basis of absorbed $CO_2$ at the start of said scrubbing.

4. The pretreatment of claim 1 wherein the dehydration of the natural gas of step (a) is carried out by passing said natural gas through a bed of molecular sieves prior to the cooling of said natural gas of steps (b), (c) and (d).

5. The pretreatment of claim 4 wherein the external refrigeration of step (m) is applied to the recycled methanol supplied to the scrubbing of step (e).

6. The pretreatment of claim 5 wherein the recycled methanol supplied to the scrubbing of step (e) is at a temperature in the range of about $-50°$ F. to $-70°$ F. and contains from about 0.5% to about 0.6% on a molar basis of absorbed $CO_2$ at the start of said scrubbing.

7. The pretreatment of claim 1 wherein the dehydration of the natural gas of step (a) is carried out by injecting methanol into said natural gas prior to the cooling of said natural gas in step (d), applying auxiliary external refrigeration to said natural gas containing said methanol after said natural gas has been cooled in step (d) to condense the moisture and said methanol in said natural gas, and removing the condensed moisture and methanol from said natural gas prior to the scrubbing thereof with cold recycled methanol in step (e).

8. The pretreatment of claim 7 wherein the condensed moisture and methanol removed from the natural gas is passed as a countercurrent stream in heat exchange with the natural gas undergoing cooling in steps (b) and (d).

9. The pretreatment of claim 7 wherein the external refrigeration of step (m) is applied to methanol withdrawn from the scrubbing of step (e).

10. The pretreatment of claim 9 wherein the recycled methanol supplied to the scrubbing of step (e) is at a temperature in the range of about $-50°$ F. to $-70°$ F. and contains from about 0.5% to about 0.6% on a molar basis of absorbed $CO_2$ at the start of said scrubbing.

11. The pretreatment of claim 10 wherein the condensed moisture and methanol removed from the natural gas is passed as a countercurrent stream in heat exchange with the natural gas undergoind cooling in steps (b) and (d), and the scrubbing of step (e) is carried out at a pressure in the range of about 250 to 450 psia.

* * * * *